United States Patent
Zhou et al.

(10) Patent No.: US 12,110,361 B2
(45) Date of Patent: Oct. 8, 2024

(54) HYBRID FOAM FORMULATIONS

(71) Applicant: Dow Global Technologies LLC, Midland, MI (US)

(72) Inventors: Weijun Zhou, Lake Jackson, TX (US); William A. Koonce, Lake Jackson, TX (US); William J. Harris, Lake Jackson, TX (US); Yonghui Zhang, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 183 days.

(21) Appl. No.: 17/414,997

(22) PCT Filed: Dec. 10, 2019

(86) PCT No.: PCT/US2019/065352
§ 371 (c)(1),
(2) Date: Jun. 17, 2021

(87) PCT Pub. No.: WO2020/131478
PCT Pub. Date: Jun. 25, 2020

(65) Prior Publication Data
US 2022/0064361 A1 Mar. 3, 2022

Related U.S. Application Data

(60) Provisional application No. 62/781,068, filed on Dec. 18, 2018.

(51) Int. Cl.
| | | |
|---|---|---|
| C08F 283/00 | (2006.01) | |
| C08G 18/18 | (2006.01) | |
| C08G 18/20 | (2006.01) | |
| C08G 18/40 | (2006.01) | |
| C08G 18/42 | (2006.01) | |
| C08G 18/48 | (2006.01) | |
| C08G 18/50 | (2006.01) | |
| C08G 18/67 | (2006.01) | |
| C08G 18/76 | (2006.01) | |
| C08J 9/14 | (2006.01) | |

(52) U.S. Cl.
CPC ....... *C08G 18/482* (2013.01); *C08G 18/1808* (2013.01); *C08G 18/1816* (2013.01); *C08G 18/2036* (2013.01); *C08G 18/4883* (2013.01); *C08G 18/5033* (2013.01); *C08G 2110/005* (2021.01)

(58) Field of Classification Search
None
See application file for complete search history.

(56) References Cited

U.S. PATENT DOCUMENTS

| | | | |
|---|---|---|---|
| 3,332,934 A | 7/1967 | Booth et al. | |
| 4,241,131 A | 12/1980 | Bailey | |
| 4,839,393 A * | 6/1989 | Buchanan | C08J 9/33 521/137 |
| 6,455,606 B1 | 9/2002 | Kaku et al. | |
| 6,855,741 B2 * | 2/2005 | Wiese | C08G 18/3218 252/182.28 |
| 7,923,479 B2 | 4/2011 | Champ et al. | |
| 8,133,953 B2 | 3/2012 | Van Engelen et al. | |
| 8,217,092 B2 | 7/2012 | Reinheimer | |
| 8,940,803 B2 | 1/2015 | Balbo et al. | |
| 9,382,372 B2 | 7/2016 | Matsufuji et al. | |
| 10,144,797 B2 | 12/2018 | Micheletti et al. | |
| 10,449,714 B2 | 10/2019 | Achten et al. | |
| 2006/0025493 A1 * | 2/2006 | Simpson | F16J 15/108 521/155 |
| 2007/0232712 A1 * | 10/2007 | Emge | C08G 18/4883 521/176 |
| 2008/0015272 A1 | 1/2008 | Mispreuve et al. | |
| 2008/0132593 A1 | 6/2008 | Reinheimer | |
| 2011/0105636 A1 | 5/2011 | Kim | |
| 2013/0030067 A1 * | 1/2013 | Mooney | C08G 18/3218 521/107 |
| 2015/0025164 A1 | 1/2015 | Golini et al. | |

FOREIGN PATENT DOCUMENTS

| | | | |
|---|---|---|---|
| DE | 102004053374 | 5/2006 | |
| JP | 2000109538 | 4/2000 | |
| JP | 2003138234 A | 5/2003 | |
| JP | 2004346297 | 12/2004 | |
| JP | 2008223001 A | 9/2008 | |
| JP | 2009263647 A | 11/2009 | |
| JP | 2010006914 A | 1/2010 | |
| JP | 2013122007 A | 6/2013 | |
| JP | 5250485 B2 | 7/2013 | |
| WO | WO-2016148914 A1 * | 9/2016 | ........... C08G 18/163 |

OTHER PUBLICATIONS

CAS Registry No. 60506-81-2 Substance Detailed obtained from CAS SciFinder in Jun. 2023.*
International Search Report & Written Opinion for related PCT Application PCT/US2019/065352, mailed Mar. 25, 2020 (12 pgs).
International Preliminary Report on Patentability for related PCT Application PCT/US2019/065352, mailed Jul. 1, 2021 (8 pgs).

\* cited by examiner

*Primary Examiner* — Melissa A Rioja

(57) ABSTRACT

Embodiments of the present disclosure are directed towards hybrid foam formulations that include: an isocyanate-reactive composition, and a high-functionality crosslinker; an azo type radical initiator; and an isocyanate.

9 Claims, No Drawings

HYBRID FOAM FORMULATIONS

This application is a National Stage Application under 35 U.S.C. § 371 of International Application Number PCT/US2019/065352, filed Dec. 10, 2019 and published as WO 2020/131478 on Jun. 25, 2020, which claims the benefit to U.S. Provisional Application 62/781,068, filed Dec. 18, 2018, the entire contents of which are incorporated herein by reference in its entirety.

FIELD OF DISCLOSURE

Embodiments of the present disclosure are directed towards hybrid foam formulations. More specifically, embodiments are directed towards hybrid foam formulations that include: an isocyanate-reactive composition, and a high-functionality crosslinker; an azo type radical initiator; and an isocyanate.

BACKGROUND

Foams are dispersions in which a gas is dispersed in a liquid material, a solid material, or a gel material. Foams may be formed by a chemical reaction of polyols and isocyanate. Foams may be utilized for a number of various applications, including insulation, bedding, furniture, vehicle seating, and carpet backing, among others.

SUMMARY

The present disclosure provides isocyanate-reactive compositions including a polyol composition having an average hydroxyl functionality from 3.7 to 5.7 based upon total polyols of the polyol composition, an average hydroxyl number from 370 to 550 mg KOH/g based upon total polyols of the polyol composition, and a number average molecular weight from 400 to 750 g/mol based upon total polyols of the polyol composition; and a high-functionality crosslinker having an average functionality of 3.0 or more, wherein functional groups of the high-functionality crosslinker are selected from acrylate groups, allyl groups, OH groups, $NH_2$ groups, COOH groups, and combinations thereof, wherein from 10 to 99 percent of the functional groups of the high-functionality crosslinker are acrylate groups, allyl groups, or combinations thereof.

The present disclosure provides hybrid foam formulations including the isocyanate-reactive composition, an azo type radical initiator, and an isocyanate.

The present disclosure provides foam products formed by curing the hybrid foam formulation.

The present disclosure provides methods of forming a foam product, the methods including combining: a polyol composition having an average hydroxyl functionality from 3.7 to 5.7 based upon total polyols of the polyol composition, an average hydroxyl number from 370 to 550 mg KOH/g based upon total polyols of the polyol composition, and a number average molecular weight from 400 to 750 g/mol based upon total polyols of the polyol composition; a high-functionality crosslinker having an average functionality of 3.0 or more, wherein functional groups of the high-functionality crosslinker are selected from acrylate groups, allyl groups, OH groups, $NH_2$ groups, COOH groups, and combinations thereof, wherein from 10 to 99 percent of the functional groups of the high-functionality crosslinker are acrylate groups, allyl groups, or combinations thereof; an azo type radical initiator; and an isocyanate to form a hybrid foam formulation; and curing the hybrid foam formulation to form a foam product.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION

Isocyanate-reactive compositions including a high-functionality crosslinker and a polyol composition having an average hydroxyl functionality from 3.7 to 5.7 based upon total polyols of the polyol composition, an average hydroxyl number from 370 to 550 mg KOH/g based upon total polyols of the polyol composition, and a number average molecular weight from 400 to 750 g/mol based upon total polyols of the polyol composition. Hybrid foam formulations including the isocyanate-reactive composition, an azo type radical initiator, and an isocyanate are disclosed herein.

These hybrid foam formulations may be cured to form hybrid foams. As used herein, "hybrid foams" refer to foams that are formed by a reaction of active hydrogen-containing molecules with isocyanates, e.g., in the presence of catalyst, surfactant and blowing agent, where the hybrid foam contains additional chemical crosslinking that is not provided by isocyanate reactions. These hybrid foams may advantageously provide a combination of properties that are desirable for a number of applications. For instance, the hybrid foams may provide desirable molded foam densities, while also providing dimensional stability. Such a combination of properties is particularly advantageous for thermal insulation applications where the foam formulation is injected into a cavity to be filled by the resultant foam, such as a refrigerator cabinet or doors.

As used herein, "a," "an," "the," "at least one," and "one or more" may be used interchangeably unless indicated otherwise. The term "and/or" means one, one or more, or all of the listed items. The recitations of numerical ranges by endpoints include all numbers subsumed within that range, e.g., 1 to 5 includes 1, 1.5, 2, 2.75, 3, 3.80, 4, 5, etc.

As mentioned, the isocyanate-reactive compositions disclosed herein include the polyol composition. Embodiments of the present disclosure provide that the polyol compositions have an average hydroxyl functionality from 3.7 to 5.7 based upon total polyols of the polyol composition. In other words, the average hydroxyl functionalities of each of the polyols of the polyol composition are utilized, i.e. averaged on a molar basis, to determine the average hydroxyl functionality of the polyol composition. All individual values and subranges from 3.7 to 5.7 are included; for example, the polyol composition may have an average hydroxyl functionality from a lower limit of 3.7, 3.9, or 4.2 to an upper limit of 5.7, 5.3, or 5.0 based upon total polyols of the polyol composition.

Embodiments of the present disclosure provide that the polyol compositions have an average hydroxyl number from 370 to 550 mg KOH/g based upon total polyols of the polyol composition. In other words, the average hydroxyl numbers of each of the polyols of the polyol composition are utilized, i.e. averaged on a molar basis, to determine the average hydroxyl number of the polyol composition. All individual values and subranges from 370 to 550 mg KOH/g are included; for example, the polyol composition may have an average hydroxyl number from a lower limit of 370, 375, 385, 390, or 400 mg KOH/g to an upper limit of 550, 520, 500, 480, or 475 mg KOH/g based upon total polyols of the polyol composition. Average hydroxyl number for each polyol of the polyol composition, as KOH, may be determined according to ASTM D4274.

Embodiments of the present disclosure provide that the polyol compositions have a number average molecular weight from 400 to 750 g/mol based upon total polyols of the polyol composition. In other words, the number average molecular weights of each of the polyols of the polyol composition are utilized, i.e. averaged on a molar basis, to determine the number average molecular weight of the polyol composition. All individual values and subranges from 400 to 750 g/mol are included; for example, the isocyanate-reactive composition may have a number average molecular weight from a lower limit of 400, 450, 500, or 525 g/mol to an upper limit of 750, 725, 700 or 650 g/mol based upon total polyols of the polyol composition.

As mentioned, the isocyanate-reactive composition includes a high-functionality crosslinker. As used herein, "high-functionality crosslinker" refers to a compound having an average functionality of 3.0 or more, i.e. an average functionality of 3.0 or more functional groups per high-functionality crosslinker molecule. For instance, the high-functionality crosslinker may have an average functionality from a lower limit of 3.0, 3.3, 3.7, 4.0, 4.3, 4.5, 4.6, 4.7, 4.8, or 4.9 to an upper limit of 9.0, 8.5, 8.0, 7.5, 7.0, 6.5, 6.3, 6.0, 5.7, or 5.5. One or more embodiments provide that the high-functionality crosslinker has an average functionality of 6.0. The functional groups of the high-functionality crosslinker may be selected from acrylate groups, allyl groups, OH groups, $NH_2$ groups, COOH groups, and combinations thereof. The functional groups of the high-functionality crosslinker may be isocyanate reactive groups. One or more embodiments of the present disclosure provide that from 10 to 99 percent of the functional groups of the high-functionality crosslinker are acrylate groups, allyl groups, or combinations thereof. All individual values and subranges from 10 to 99 percent are included; for example, acrylate groups, allyl groups, or combinations thereof may be from a lower limit of 10, 15, 20, 25, 30, 40, 50, 60, or 70 percent to an upper limit of 99, 98, 95, 90, 88, or 85 percent of the functional groups of the high-functionality crosslinker.

The high-functionality crosslinker may have a number average molecular weight from 100 to 1500 g/mol. All individual values and subranges from 100 to 1500 g/mol are included; for example, the high-functionality crosslinker may have a number average molecular weight from a lower limit of 100, 200, 300, 360, 380, or 400 g/mol to an upper limit of 1500, 1300, 1100, 1000, 950, or 900, g/mol.

The high-functionality crosslinker may be prepared using known equipment and reaction conditions. The high-functionality crosslinker may be obtained commercially. Examples of the high-functionality crosslinker include, but are not limited to, dipentaerythritol penta-/hexa-acrylate, triallyl citrate, dipentaerythritol pentaacrylate, pentaerythritol triacrylate, di-trimethylolpropane triacrylate, and combinations thereof among others. One or more embodiments of the present disclosure provide that the high-functionality crosslinker is selected from dipentaerythritol pentaacrylate, dipentaerythritol penta-/hexa-acrylate, pentaerythritol triacrylate, and combinations thereof.

The high-functionality crosslinker may be from 2 to 40 parts of the isocyanate-reactive composition based upon 100 parts of a combination of total polyols of the polyol composition and the high-functionality crosslinker. All individual values and subranges from 2 to 40 parts are included; for example, the high-functionality crosslinker may be from a lower limit of 2, 3, 4, 5, or 10 parts to an upper limit of 40, 35, 30, 25, or 20 parts of the isocyanate-reactive composition based upon 100 parts of a combination of total polyols of the polyol composition and the high-functionality crosslinker.

As previously mentioned, the isocyanate-reactive compositions include a polyol composition. As used herein, "polyol" refers to a compound having an average hydroxyl functionality of 1.8 or greater, such as diols, triols, tetrols, and such. A number of various polyols may be utilized for the polyol composition, such as those discussed herein, among other polyols known to those skilled in the art.

One or more embodiments of the present disclosure provide that the polyol composition may include a sorbitol-initiated polyether polyol. The sorbitol-initiated polyether polyol may have an average hydroxyl functionality from 5.0 to 6.0. All individual values and subranges from 5.0 to 6.0 are included; for example, the sorbitol-initiated polyether polyol may have an average hydroxyl functionality from a lower limit of 5.0, 5.2, or 5.5 to an upper limit of 6.0.

The sorbitol-initiated polyether polyol may have an average hydroxyl number from 300 to 600 mg KOH/g. All individual values and subranges from 300 to 600 mg KOH/g are included; for example, the sorbitol-initiated polyether polyol may have an average hydroxyl number from a lower limit of 300, 350, 400, 425, or 450 mg KOH/g to an upper limit of 600, 575, or 550 mg KOH/g.

The sorbitol-initiated polyether polyol may have a number average molecular weight from 500 to 1100 g/mol. All individual values and subranges from 500 to 1100 g/mol are included; for example, the sorbitol-initiated polyether polyol may have a number average molecular weight from a lower limit of 500, 550, 600, or 650 g/mol to an upper limit of 1100, 1000, 900, 850, 800, or 750 g/mol.

The sorbitol-initiated polyether polyol may have a hydroxyl equivalent molecular weight from 90 to 150 g/eq. All individual values and subranges from 90 to 150 g/eq are included; for example, the sorbitol-initiated polyether polyol may have a hydroxyl equivalent molecular weight from a lower limit of 90, 100, or 110 g/eq to an upper limit of 150, 140, or 130 g/eq.

The sorbitol-initiated polyether polyol may have a propylene oxide content of at least 60 weight percent based upon a total weight of the sorbitol-initiated polyether polyol. For instance, the sorbitol-initiated polyether polyol may have a propylene oxide content from 60 to 98 weight percent based upon a total weight of the sorbitol-initiated polyether polyol. All individual values and subranges from 60 to 98 weight percent are included; for example, the sorbitol-initiated polyether polyol may have a propylene oxide content from a lower limit of 60, 65, 70, 72, or 75 weight percent to an upper limit of 98, 95, 90, 88, or 85. The sorbitol-initiated polyether polyol may include structural units derived from another alkylene oxide, e.g., ethylene oxide and/or butylene oxide, among others.

The sorbitol-initiated polyether polyol may be prepared using known equipment and reaction conditions. For instance, the sorbitol-initiated polyether polyol may be formed from reaction mixtures including sorbitol and alkylene oxides, e.g., ethylene oxide, propylene oxide, and/or butylene oxide. The sorbitol-initiated polyether polyol may be capped, e.g., the addition of the alkylene oxide may be staged to preferentially locate or cap a particular alkylene oxide in a desired position of the polyol.

The sorbitol-initiated polyether polyol may be obtained commercially. Examples of commercially available sorbitol-initiated polyether polyols include, but are not limited to, a number of polyols sold under the trade name VORANOL™, such as VORANOL RN 482, available from The Dow Chemical Company, among others.

When utilized, the sorbitol-initiated polyether polyol may be from 10 to 75 parts of the isocyanate-reactive composition based upon 100 parts of a combination of total polyols of the polyol composition and the high-functionality crosslinker. All individual values and subranges from 10 to 75 parts are included; for example, the sorbitol-initiated polyether polyol may be from a lower limit of 10, 15, 20, 25, 30, or 35 parts to an upper limit of 75, 70, 65, 60, 55, 50 or 45 parts of the isocyanate-reactive composition based upon 100 parts of a combination of total polyols of the polyol composition and the high-functionality crosslinker.

One or more embodiments of the present disclosure provide that the polyol composition may include an amine-initiated polyol. The amine-initiated polyol may be initiated from aromatic amine or aliphatic amine, for example, the amine-initiated polyol may be an ortho toluenediamine (o-TDA) initiated polyol, an ethylenediamine initiated polyol, a diethylenetriamine, triisopropanolamine initiated polyol, or a combination thereof, among others.

The amine-initiated polyol may have an average hydroxyl functionality from 3.0 to 6.0. All individual values and subranges from 3.0 to 6.0 are included; for example, the amine-initiated polyol may have an average hydroxyl functionality from a lower limit of 3.0, 3.5, or 4.0 to an upper limit of 6.0, 5.0, or 4.5.

The amine-initiated polyol may have an average hydroxyl number from 250 to 650 mg KOH/g. All individual values and subranges from 250 to 650 mg KOH/g are included; for example, the amine-initiated polyol may have an average hydroxyl number from a lower limit of 250, 300, 350, 400, 425, or 450 mg KOH/g to an upper limit of 650, 625, 600, 575, or 550 mg KOH/g.

The amine-initiated polyol may have a number average molecular weight from 250 to 750 g/mol. All individual values and subranges from 250 to 750 g/mol are included; for example, the amine-initiated polyol may have a number average molecular weight from a lower limit of 250, 350, 375, or 400 g/mol to an upper limit of 750, 600, 575, or 550, g/mol.

The amine-initiated polyol may have a hydroxyl equivalent molecular weight from 60 to 260 g/eq. All individual values and subranges from 60 to 260 g/eq are included; for example, the amine-initiated polyol may have a hydroxyl equivalent molecular weight from a lower limit of 60, 90, 100, or 110 g/eq to an upper limit of 260, 220, 200, 180, 150, 140, or 130 g/eq.

The amine-initiated polyol may have a propylene oxide content of at least 60 weight percent based upon a total weight of the amine-initiated polyol. For instance, the amine-initiated polyol may have a propylene oxide content from 60 to 98 weight percent based upon a total weight of the amine-initiated polyol. All individual values and subranges from 60 to 98 weight percent are included; for example, the amine-initiated polyol may have a propylene oxide content from a lower limit of 60, 70, 72, or 75 weight percent to an upper limit of 98, 95, 90, 88, or 85. The amine-initiated polyol may include structural units derived from another alkylene oxides, e.g., ethylene oxide and/or butylene oxide, among others.

The amine-initiated polyol may be prepared using known equipment and reaction conditions. For instance, the amine-initiated polyol may be formed from reaction mixtures including aromatic amines or aliphatic amines and alkylene oxides, e.g., ethylene oxide and/or butylene oxide, among others. The alkylene oxides may be added into an alkoxylation reactor in one step or via several steps in sequence, wherein in each step, a single alkylene oxide or a mixture of alkylene oxides may be used.

When utilized, the amine-initiated polyol may be from 10 to 75 parts of the isocyanate-reactive composition based upon 100 parts of a combination of total polyols of the polyol composition and the high-functionality crosslinker. All individual values and subranges from 10 to 75 parts are included; for example, the amine-initiated polyol may be from a lower limit of 10, 15, 20, 25, 30, or 35 parts to an upper limit of 75, 70, 65, 60, 55, 50, or 45 parts of the polyol composition based upon 100 parts of a combination of total polyols of the polyol composition and the high-functionality crosslinker.

One or more embodiments of the present disclosure provide that the polyol composition may include a sucrose/glycerine-initiated polyether polyol. The sucrose/glycerine-initiated polyether polyol may have an average hydroxyl functionality from 3.5 to 7.5. All individual values and subranges from 3.5 to 7.5 are included; for example, the sucrose/glycerine-initiated polyether polyol may have an average hydroxyl functionality from a lower limit of 3.5, 3.7, or 4.0 to an upper limit of 7.5, 7.0, 6.5, 6.0, 5.5, 6.3, or 5.0.

The sucrose/glycerine-initiated polyether polyol may have an average hydroxyl number from 260 to 460 mg KOH/g. All individual values and subranges from 260 to 460 mg KOH/g are included; for example, the third polyether polyol may have an average hydroxyl number from a lower limit of 260, 290, or 320 mg KOH/g to an upper limit of 460, 430, or 400 mg KOH/g.

The sucrose/glycerine-initiated polyether polyol may have a number average molecular weight from 500 to 1500 g/mol. All individual values and subranges from 500 to 1500 g/mol are included; for example, the sucrose/glycerine-initiated polyether polyol may have a number average molecular weight from a lower limit of 500, 550, 600, or 650 g/mol to an upper limit of 1500, 1400, 1250, 1000, 900, 850, 800, or 750 g/mol.

The sucrose/glycerine-initiated polyether polyol may have a hydroxyl equivalent molecular weight from 90 to 250 g/eq. All individual values and subranges from 90 to 250 g/eq are included; for example, the sucrose/glycerine-initiated polyether polyol may have a hydroxyl equivalent molecular weight from a lower limit of 90, 100, or 110 g/eq to an upper limit of 250, 200, 175, 150, 140, or 130 g/eq.

The sucrose/glycerine-initiated polyether polyol may have a propylene oxide content of at least 60 weight percent based upon a total weight of the sucrose/glycerine-initiated polyether polyol. For instance, the sucrose/glycerine-initiated polyether polyol may have a propylene oxide content from 60 to 98 weight percent based upon a total weight of the sucrose/glycerine-initiated polyether polyol. All individual values and subranges from 60 to 98 weight percent are included; for example, the sucrose/glycerine-initiated polyether polyol may have a propylene oxide content from a lower limit of 60, 65, 70, 72, or 75 weight percent to an upper limit of 98, 95, 90, 88, or 85. The sucrose/glycerine-initiated polyether polyol may include structural units derived from another alkylene oxide, e.g., ethylene oxide. The sucrose/glycerine-initiated polyether polyol may include structural units derived from styrene-acrylonitrile, polyisocyanate, and/or polyurea.

The sucrose/glycerine-initiated polyether polyol may be prepared using known equipment and reaction conditions. For instance, the sucrose/glycerine-initiated polyether polyol may be formed from reaction mixtures including sucrose, propylene oxide, and glycerin. One or more embodiments provide that the sucrose/glycerine-initiated polyether polyol is formed via a reaction of sucrose and propylene oxide. The sucrose/glycerine-initiated polyether polyol may be obtained commercially. Examples of commercially available sucrose/glycerine-initiated polyether polyols include, but are not limited to, a number of polyols sold under the trade name VORANOL, such as VORANOL 360, VORANOL 490, and VORANOL 280 available from The Dow Chemical Company, among others.

When utilized, the sucrose/glycerine-initiated polyether polyol may be from 5 to 50 parts of the isocyanate-reactive composition based upon 100 parts of a combination of total polyols of the polyol composition and the high-functionality crosslinker. All individual values and subranges from 5 to 50 parts are included; for example, the sucrose/glycerine-initiated polyether polyol may be from a lower limit of 5, 8, or 10 parts an upper limit of 50, 45, 40, 35, 30, 25, 23, or 20 parts of the isocyanate-reactive composition based upon 100 parts of a combination of total polyols of the polyol composition and the high-functionality crosslinker.

One or more embodiments of the present disclosure provide that the polyol composition may include a diol. The diol may have an average hydroxyl functionality of 2.0. The diol may be a polyether diol. The diol may be a glycol.

The diol may have an average hydroxyl number from 75 to 750 mg KOH/g. All individual values and subranges from 75 to 750 mg KOH/g are included; for example, the diol may have an average hydroxyl number from a lower limit of 75, 150, or 200 mg KOH/g to an upper limit of 750, 550, or 350 mg KOH/g.

The diol may have a number average molecular weight from 150 to 1500 g/mol. All individual values and subranges from 150 to 1500 g/mol are included; for example, the diol may have a number average molecular weight from a lower limit of 150, 200, 225, 250, 300, or 350 g/mol to an upper limit of 1500, 1450, 1400, or 1300 g/mol.

The diol may have a hydroxyl equivalent molecular weight from 75 to 750 g/eq. All individual values and subranges from 75 to 750 g/eq are included; for example, the diol may have a hydroxyl equivalent molecular weight from a lower limit of 75, 100, or 125 g/eq to an upper limit of 750, 700, or 650 g/eq.

The diol may have a propylene oxide content of at least 40 weight percent based upon a total weight of the diol. For instance, the diol may have a propylene oxide content from 40 to 98 weight percent based upon a total weight of the diol. All individual values and subranges from 40 to 98 weight percent are included; for example, the diol may have a propylene oxide content from a lower limit of 40, 45, 50, 60, 70, 72, or 75 weight percent to an upper limit of 98, 95, 90, 88, or 85. The diol may include structural units derived from another alkylene oxide, e.g., ethylene oxide.

The diol may be prepared using known equipment and reaction conditions. The diol may be obtained commercially. Examples of commercially available diols include, but are not limited to, a number of polyols sold under the trade name VORANOL, such as VORANOL 2110 TB, available from The Dow Chemical Company, and as DOW™ P-425, PT-250, and PT-1200, available from The Dow Chemical Company, among others.

When utilized, the diol may be from 1 to 15 parts of the isocyanate-reactive composition based upon 100 parts of a combination of total polyols of the polyol composition and the high-functionality crosslinker. All individual values and subranges from 1 to 15 parts are included; for example, the polyether diol may be from a lower limit of 1, 2, or 5 parts to an upper limit of 15, 12, or 10 parts of the isocyanate-reactive composition based upon 100 parts of a combination of total polyols of the polyol composition and the high-functionality crosslinker.

One or more embodiments of the present disclosure provide that the polyol composition may include an aromatic polyester polyol. As used herein "aromatic polyester polyol" refers to a polyester polyol including an aromatic ring. As an example, the aromatic polyester polyol may be phthalic anhydride diethylene glycol polyester or may be prepared from the use of aromatic dicarboxylic acid with glycols. The aromatic polyester polyol may be a hybrid polyester-polyether polyol, e.g., as discussed in International Publication No. WO 2013/053555.

The aromatic polyester polyol may have an average hydroxyl functionality from 1.8 to 3.0. All individual values and subranges from 1.8 to 3.0 are included; for example, the aromatic polyester polyol may have an average hydroxyl functionality from a lower limit of 1.8, 1.9, or 2.0 to an upper limit of 3.0, 2.7, or 2.3.

The aromatic polyester polyol may have an average hydroxyl number from 100 to 500 mg KOH/g. All individual values and subranges from 100 to 500 mg KOH/g are included; for example, the aromatic polyester polyol may have an average hydroxyl number from a lower limit of 100, 125, 150, 180, or 200 mg KOH/g to an upper limit of 500, 400, 350, 320, or 300 mg KOH/g.

The aromatic polyester polyol may have a number average molecular weight from 300 to 750 g/mol. All individual values and subranges from 300 to 750 g/mol are included; for example, the aromatic polyester polyol may have a number average molecular weight from a lower limit of 300, 350, or 400 g/mol to an upper limit of 750, 700, 600, 550, or 500, g/mol.

The aromatic polyester polyol may have a hydroxyl equivalent molecular weight from 150 to 350 g/eq. All individual values and subranges from 150 to 350 g/eq are included; for example, the aromatic polyester polyol may have a hydroxyl equivalent molecular weight from a lower limit of 150, 175, or 200 g/eq to an upper limit of 350, 325, 300, or 250 g/eq.

The aromatic polyester polyol may be prepared using known equipment and reaction conditions. The aromatic polyester polyol may be obtained commercially. Examples of commercially available aromatic polyester polyols include, but are not limited to, a number of polyols sold under the trade name STEPANPOL, such as STEPANPOL PS-2352, available from Stepan, among others.

When utilized, the aromatic polyester polyol may be from 1 to 20 parts of the isocyanate-reactive composition based upon 100 parts of a combination of total polyols of the polyol composition and the high-functionality crosslinker. All individual values and subranges from 1 to 20 parts are included; for example, the aromatic polyester polyol may be from a lower limit of 1, 2, or 5 parts to an upper limit of 20, 15, 12, or parts of the isocyanate-reactive composition based upon 100 parts of a combination of total polyols of the polyol composition and the high-functionality crosslinker.

Embodiments of the present disclosure provide that the isocyanate-reactive composition and/or the hybrid foam formulation may include a catalyst, e.g., the catalyst may be added to the isocyanate-reactive composition, the hybrid foam formulation, or a combination thereof. The catalyst may be a blowing catalyst, a gelling catalyst, a trimerization catalyst, or combinations thereof. As used herein, blowing catalysts and gelling catalysts, may be differentiated by a tendency to favor either the urea (blow) reaction, in the case of the blowing catalyst, or the urethane (gel) reaction, in the case of the gelling catalyst. A trimerization catalyst may be utilized to promote the isocyanurate reaction in the compositions.

Examples of blowing catalysts, e.g., catalysts that may tend to favor the blowing reaction include, but are not limited to, short chain tertiary amines or tertiary amines containing an oxygen. The amine based catalyst may not be sterically hindered. For instance, blowing catalysts include bis-(2-dimethylaminoethyl)ether; pentamethyldiethylenetriamine, triethylamine, tributyl amine, N,N-dimethylaminopropylamine, dimethylethanolamine, N,N,N',N'-tetramethylethylenediamine, and combinations thereof, among others. An example of a commercial blowing catalyst is POLYCAT 5, from Evonik, among other commercially available blowing catalysts.

Examples of gelling catalysts, e.g., catalyst that may tend to favor the gel reaction, include, but are not limited to, organometallic compounds, cyclic tertiary amines and/or long chain amines, e.g., that contain several nitrogen atoms, and combinations thereof. Organometallic compounds include organotin compounds, such as tin(II) salts of organic carboxylic acids, e.g., tin(II) diacetate, tin(II) dioctanoate, tin(II) dimethylhexanoate, and tin(II) dilaurate, and dialkyltin(IV) salts of organic carboxylic acids, e.g., dibutyltin diacetate, dibutyltin dilaurate, dibutyltin maleate and dioctyltin diacetate. Bismuth salts of organic carboxylic acids may also be utilized as the gelling catalyst, such as, for example, bismuth octanoate. Cyclic tertiary amines and/or long chain amines include dimethylbenzylamine, triethylenediamine, and combinations thereof, and combinations thereof. Examples of a commercially available gelling catalysts are POLYCAT 8 and DABCO T-12 from Evonik, among other commercially available gelling catalysts.

Examples of trimerization catalysts include PMDETA-N, N,N',N",N"-pentamethyldiethylenetriamine; N,N',N"-Tris (3-dimethylaminopropyl)hexahydro-S-triazine; N,N-dimethylcyclo-hexylamine; 1,3,5-tris(N,N-dimethylaminopropyl)-s-hexahydrotriazine; [2,4,6-Tris (dimethylaminomethyl) phenol]; potassium acetate, potassium octoate; tetraalkylammonium hydroxides such as tetramethylammonium hydroxide; alkali metal hydroxides such as sodium hydroxide; alkali metal alkoxides such as sodium methoxide and potassium isopropoxide; and alkali metal salts of long-chain fatty acids having 10 to 20 carbon atoms and, combinations thereof, among others. Some commercially available trimerization catalysts include DABCO TMR-2, TMR-7, DABCO K 2097; DABCO K15, POLYCAT 41, and POLYCAT 46, each from Evonik, among other commercially available trimerization catalysts.

The catalyst may be from 0.05 to 10.0 parts of the isocyanate-reactive composition and/or the hybrid foam formulation based upon 100 parts of a combination of total polyols of the polyol composition and the high-functionality crosslinker. All individual values and subranges from 0.05 to 10.0 parts are included; for example, the catalyst may be from a lower limit of 0.05, 0.07, 0.1, 0.2, or 0.3 parts to an upper limit of 10.0, 9.0, 8.0, 7.0, 6.0, 5.0, 4.5, 4.0, 3.5, 3.4, or 3.3 parts of the isocyanate-reactive composition and/or the hybrid foam formulation based upon 100 parts of a combination of total polyols of the polyol composition and the high-functionality crosslinker.

Embodiments of the present disclosure provide that the isocyanate-reactive composition and/or the hybrid foam formulation may include a blowing agent, e.g., the blowing agent may be added to the isocyanate-reactive composition, the hybrid foam formulation, or a combination thereof. The blowing agent may be a physical blowing agent, a chemical blowing agent, or combinations thereof.

Examples of physical blowing agents include liquid carbon dioxide; ketones, such as acetone; esters; aldehydes; alkanes; cycloalkanes, such as, cyclopentane, cyclohexane, cyclobutane and mixtures thereof; other cycloalkanes having up to 7 carbon atoms; ethers, such as dialkyl ethers, cycloalkylene ethers, fluoroalkanes, hydrofluoroolefins, hydrochlorofluoroolefins, and mixtures thereof. Examples of alkanes include, but are not limited to, propane, butane, n-butane, isobutane, n-pentane, isopentane and combinations thereof. Examples of dialkyl ethers include dimethyl ether, methyl ethyl ether, methyl butyl ether, diethyl ether, and combinations thereof. An example of a cycloalkylene ether is furan. Examples of fluoroalkanes include, but are not limited to, pentafluoropropane, trifluoromethane, difluoromethane, difluoroethane, tetrafluoroethane, hepta-fluoropropane, pentafluorobutane, heptafluorobutane, and combinations thereof, among others. Examples of hydrofluoroolefins and/or hydrochlorofluoroolefins include, but are not limited to 1,1,1,4,4,5,5,5-octafluoro-2-pentene (HFC-1438mzz), Z-1,1,1,4,4,4-hexafluoro-2-butene (HFC-1336mzz, Z-isomer), trans-1,3,3,3-tetrafluoropropene, 1-chloro-3,3,3-trifluoropropene (HFO-1233zd). One or more embodiments provide that trans-1-chloro-3,3,3-trifluoropropene is utilized. An example of a commercially available physical blowing agents is Solstice 1233zd Liquid Blowing Agent from Honeywell, among other commercially available physical blowing agents.

Examples of chemical blowing agents include, but are not limited to, water, formic acid, methyl formate, $CO_2$ generating materials, and combinations thereof.

The blowing agent may be from 1.0 to 50.0 parts of the isocyanate-reactive composition and/or the hybrid foam formulation based upon 100 parts of a combination of total polyols of the polyol composition and the high-functionality crosslinker. All individual values and subranges from 1.0 to 50.0 parts are included; for example, the blowing agent may be from a lower limit of 1.0, 1.5, or 2.0 parts to an upper limit of 50.0, 45.0, 43.0, 40.0, or 38.0 parts of the isocyanate-reactive composition and/or the hybrid foam formulation based upon 100 parts of a combination of total polyols of the polyol composition and the high-functionality crosslinker.

The isocyanate-reactive composition and/or the hybrid foam formulation disclosed herein may include a surfactant, e.g., the surfactant may be added to the isocyanate-reactive composition, the hybrid foam formulation, or a combination thereof. The surfactant may be a cell-stabilizing surfactant. Examples of surfactants include silicon-based compounds such as organosilicone-polyether copolymers, such as polydimethylsiloxane-polyoxyalkylene block copolymers, e.g., polyether modified polydimethyl siloxane, and combinations thereof. Examples of surfactants include non-silicone based organic surfactants such as VORASURF™ 504, available from The Dow Chemical Company. Surfactants are available commercially and include those available under trade names such as NIAX, such as NIAX L 6988; DABCO; and TEGOSTAB, such as TEGOSTAB B 8427; among others.

The surfactant may be from 0.1 to 10.0 parts of the isocyanate-reactive composition and/or the hybrid foam formulation based upon 100 parts of a combination of total polyols of the polyol composition and the high-functionality crosslinker. All individual values and subranges from 0.1 to 10.0 parts are included; for example, the surfactant may be from a lower limit of 0.1, 0.2, or 0.3 parts to an upper limit of 10.0, 9.0, 8.0, 7.0, 6.0, 5.0, 4.0, or 3.0 parts of the isocyanate-reactive composition and/or the hybrid foam formulation based upon 100 parts of a combination of total polyols of the polyol composition and the high-functionality crosslinker.

As mentioned, the hybrid foam formulations disclosed herein include the isocyanate-reactive composition, an azo type radical initiator, and an isocyanate. As used herein, "azo type radical initiator" refers to a compound having an azo group. An azo group may be represented by the formula: $RR^1R^2CN\!=\!NCR^3R^4R^5$, where R, $R^1$, $R^2$, $R^3$, $R^4$, and $R^5$ are each independently alkyl, substituted alkyl, nitrile, ester, amide, amidine, imidazoline, alkyl-O-alkyl, alkyl-COOH. One or more embodiments provide that R,$R^1$ and/or $R^4$,$R^5$ are combined to be a respective cycloalkyl group.

While not wishing to be bound to theory, it is believed that the azo type radical initiator, as utilized in the hybrid foam formulations disclosed herein, may decompose to form nitrogen gas and carbon radicals to addition-polymerize one or more components of the hybrid foam formulation. Surprisingly, not all radical initiators are suitable for providing the hybrid foams, as disclosed herein, that may provide desirable molded foam densities and thermal insulation performance, while also providing dimensional stability. For example, peroxide radical initiators are not suitable for providing the hybrid foams, as disclosed herein. Surprisingly when peroxide radical initiators are utilized, the resultant foam may have an undesirable un-uniform cell structure and/or undesirable cell deformities, such as undesirable large cell sizes.

One or more embodiments provide that the hybrid foam formulations are substantially free of peroxide radical initiators. Herein, utilizing less than 0.1 weight percent of peroxide radical initiator based upon a total weight of the hybrid foam formulation is considered a nominal amount of the peroxide radical initiator and the hybrid foam formulation is considered substantially free of peroxide radical initiators.

As mentioned, not all radical initiators are suitable for providing the hybrid foams, as disclosed herein. While not wishing to be bound to theory, the suitable azo type radical initiators, at the specified concentrations, are able to generate an appreciable number of radicals at a particular temperature range to facilitate and promote the dual curing during foam formation. This particular temperature range may be determined as a half-life temperature for 0.10 hour, where half-life refers to the time and temperature to convert half the azo type radical initiator to radical species and/or by-products. One or more embodiments of the present disclosure provide that the azo type radical initiator may have a half-life temperature for 0.10 hour from 0° C. to 135° C. All individual values and subranges from 0° ° C. to 135° C. are included; for example, the azo type radical initiator may have a half-life temperature for 0.10 hour from a lower limit of 0, 10, 20, or 30° C. to an upper limit of 135, 130, 120, or 110° C.

Half-life, $t_{1/2}$, in seconds (s) may be determined from the Arrhenius equation, $k_d\!=\!Ae^{-Ea/RT}$ and the equation $t_{1/2}\!=\!\ln 2/k_d$, where $k_d$ is a rate constant for azo initiator dissociation in $s^{-1}$, A is the Arrhenius frequency factor in $s^{-1}$, Ea is the Activation energy for the azo initiator dissociation in J/mole, R is 8.3142 J/mole·K, T is temperature in K, where values for Ea, A, and/or $k_d$ known for azo type radical initiators. For example, 2,2'-azobis(isobutyronitrile) (AIBN) with an A of 2.89E+15 $s^{-1}$ and Ea of 130.23 KJ/mole has a 0.10 hour half-life temperature of 100° C.; 2,2'-azobis (2-methylbutyronitrile) with an A of 1.38E+15 $s^{-1}$ and Ea of 128.93 KJ/mole has a 0.10 hour half-life temperature of 103° C.; and 1,1'-azobis(cyclohexane-1-carbonitrile) with an A of 1.10E+16 $s^{-1}$ and Ea of 142.19 KJ/mole has a 0.10 hour half-life temperature of 122° C.

The azo type radical initiator may be an azo nitrile, an azo ester, an azo amide, an azo amidine, azo imidazoline or a combination thereof. Examples of the azo type radical initiator are 2,2'-azobis(isobutyronitrile) (AIBN), 2,2'-azobis(4-methoxy-2,4-dimethylvaleronitrile), 2,2'-azobis(2,4-dimethylvaleronitrile), 2,2'-azobis (2-methylbutyronitrile), 1,1'-azobis(cyclohexane-1-carbonitrile), 4,4'-azobis(4-cyanovaleric acid), dimethyl 2,2'-azobis(2-methylpropionate), 2,2'-azobis[2-methyl-N-(2-hydroxyethyl)propionamide], 2,2'-azobis[2-(2-imidazolin-2-yl)propane], 2,2'-azobis(2-methylpropionamidine)dihydrochloride, 2,2'-azobis[N-(2-carboxyethyl)-2-methylpropionamidine]tetrahydrate, and combinations thereof, among others.

The azo type radical initiator may be from 0.01 to 5.0 parts of the hybrid foam formulation based upon 100 parts of a combination of total polyols of the polyol composition and the high-functionality crosslinker. All individual values and subranges from 0.01 to 5.0 parts are included; for example, the azo type radical initiator may be from a lower limit of 0.01, 0.05, 0.1, or 0.5 parts to an upper limit of 5.0, 4.5, 4.0, 3.5, 3.3, or 3.0 parts of the hybrid foam formulation based upon 100 parts of a combination of total polyols of the polyol composition and the high-functionality crosslinker.

The hybrid foam formulation disclosed herein include an isocyanate. The isocyanate may be a polyisocyanate. As used herein, "polyisocyanate" refers to a molecule having an average of greater than 1.0 isocyanate groups/molecule, e.g. an average functionality of greater than 1.0.

The isocyanate may be an aliphatic polyisocyanate, a cycloaliphatic polyisocyanate, an araliphatic polyisocyanate, an aromatic polyisocyanate, or combinations thereof, for example. Examples of isocyanates include, but are not limited to, polymethylene polyphenylisocyanate, toluene 2,4-/2,6-diisocyanate (TDI), methylenediphenyl diisocyanate (MDI), polymeric MDI, triisocyanatononane (TIN), naphthyl diisocyanate (NDI), 4,4'-diisocyanatodicyclohexylmethane, 3-isocyanatomethyl-3,3,5-trimethylcyclohexyl isocyanate (isophorone diisocyanate IPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 4,4'-diisocyanato-2,2-dicyclohexylpropane, 3-isocyanatomethyl-1-methyl-1-isocyanatocyclohexane (MCI), 1,3-diisooctylcyanato-4-methylcyclohexane, 1,3-diisocyanato-2-methylcyclohexane, and combinations thereof, among others. As well as the isocyanates mentioned above, partially modified polyisocyanates including uretdione, isocyanurate, carbodiimide, uretonimine, allophanate or biuret structure, and combinations thereof, among others, may be utilized.

The isocyanate may be polymeric. As used herein "polymeric", in describing the isocyanate, refers to higher molecular weight homologues and/or isomers. For instance, polymeric methylene diphenyl isocyanate refers to a higher molecular weight homologue and/or an isomer of methylene diphenyl isocyanate.

As mentioned, the isocyanate may have an average functionality of greater than 1.0 isocyanate groups/molecule. For instance, the isocyanate may have an average functionality from 1.75 to 3.50. All individual values and subranges from 1.75 to 3.50 are included; for example, the isocyanate may have an average functionality from a lower limit of 1.75, 1.85, or 1.95 to an upper limit of 3.50, 3.40 or 3.30.

The isocyanate may have an isocyanate equivalent weight 80 g/eq to 300 g/eq. All individual values and subranges from 80 to 300 g/eq are included; for example, the isocyanate may have an isocyanate equivalent weight from a lower limit of 80, 90, 100, 125, 135, or 145 to an upper limit of 300, 290, 285, or 280 g/eq.

The isocyanate may be prepared by a known process. For instance, the polyisocyanate may be prepared by phosgenation of corresponding polyamines with formation of polycarbamoyl chlorides and thermolysis thereof to provide the polyisocyanate and hydrogen chloride, or by a phosgene-free process, such as by reacting the corresponding polyamines with urea and alcohol to give polycarbamates, and thermolysis thereof to give the polyisocyanate and alcohol, for example.

The isocyanate may be obtained commercially. Examples of commercial isocyanates include, but are not limited to, polyisocyanates under the trade names VORANATE™, PAPI™, VORATEC™, and ISONATE™, such as VORANATE™ M 220, and PAPI™ 27, available from The Dow Chemical Company, among other commercial isocyanates.

The isocyanate may be from 70 to 400 parts of the hybrid foam formulation based upon 100 parts of a combination of total polyols of the polyol composition and the high-functionality crosslinker. All individual values and subranges from 70 to 400 parts are included; for example, the isocyanate or may be from a lower limit of 70, 80, 100, 110, 125, or 140 parts to an upper limit of 400, 350, 300, 275, 250, 225, 215, 200, or 180 parts based upon 100 parts of a combination of total polyols of the polyol composition and the high-functionality crosslinker.

The isocyanate may be utilized such that isocyanate-reactive components may be reacted with isocyanate components at an isocyanate index from 80 to 300. For instance, isocyanate-reactive components may be reacted with isocyanate components at an isocyanate index from 80 to 300, 85 to 250, 85 to 220, 90 to 180, or 95 to 150, among others. The isocyanate index may be determined as equivalents of isocyanate divided by the total equivalents of isocyanate-reactive components, e.g., isocyanate-reactive hydrogen, multiplied by 100. In other words, the isocyanate index can be determined as a ratio of isocyanate-groups to isocyanate-reactive hydrogen, given as a percentage. For rigid foam applications, according to exemplary embodiments, the isocyanate index may be from 100 to 150

One or more embodiments of the present disclosure provide that the isocyanate index may be from 100 to 150, e.g., for rigid foam applications. All individual values and subranges from 100 to 150 are included; for example, the hybrid foam formulations may have an isocyanate index from a lower limit of 100, 103, 105, or 110 to an upper limit of 150, 140, 130, or 125.

One or more embodiments of the present disclosure provide that the isocyanate-reactive composition and/or the hybrid foam formulations discussed herein may include one or more additional components e.g., additional components known in the art. Examples of additional components include cell compatibilizing agents, additional crosslinkers, toughening agents, flow modifiers, viscosity modifiers, reactivity modifiers, solvents, carriers, adhesion promoters, diluents, stabilizers, plasticizers, catalyst de-activators, flame retardants, inorganic fillers, smoke suppression agents, liquid nucleating agents, solid nucleating agents, Ostwald ripening retardation additives, pigments, colorants, chain extenders, antioxidants, biocide agents, and combinations thereof, among others known in the art. Different additional components and/or different amounts of the additional components may be utilized for various applications.

The hybrid foam formulations disclosed herein may be cured to form a foam product, e.g., a hybrid foam. One or more embodiments of the present disclosure is directed toward a method of forming a foam product. The hybrid foam formulations and/or the foam products may be prepared using known methods, equipment, and conditions, which may vary for different applications.

Forming the foam products may include admixing a number of the components discussed herein. For instance, an "A-side", which may include the isocyanate and a number of components discussed herein, may be admixed with a "B-side", which may include the polyol composition and a number of components discussed herein. Embodiments of the present disclosure provide that components, e.g., the high-functionality crosslinker, the azo type radical initiator, the blowing agent, and the catalyst, among others, may respectively and independently be added to the A-side, the B-side, or a combination thereof.

As an example, to form a foam product, e.g., a rigid polyurethane foam, the A-side may be admixed with the B-side, at ambient temperature and at a desired weight ratio, to form a reactive mixture. The weight ratio may be from 0.25:1 to 4:1 weight percent of A-side to B-side; one or more embodiments provide that the weight ratio may be from 0.5:1 to 2:1 weight percent of A-side to B-side. The reactive mixture may be subjected to conditions sufficient to allow the foaming reaction to occur and to cure the reactive mixture to form the foam product. For instance, the reactive mixture may be heated to a temperature from 25° C. to 80° C. for curing. All individual values and subranges from 25° C. to 80° C. are included; for example, the reactive mixture may be heated to a temperature from a lower limit of 25, 35, or 45° C. to an upper limit of 80, 75, or 70° C.

As previously mentioned the hybrid foam formulations may be prepared using known methods, equipment, and conditions. The azo type radical initiator may be incorporated into the hybrid foam formulations by one or more various processes. For instance, the azo type radical initiator may be pre-dissolved into an isocyanate component, e.g., to form a solution. Then the solution containing a pre-dissolved azo type radical initiator may be mixed with the isocyanate-reactive composition. A liquid medium other than an isocyanate may also be utilized to pre-dissolve, which may be referred to as pre-disperse, the azo type radical initiator. The azo type radical initiator may be added to the isocyanate and/or the isocyanate-reactive composition online and/or before the isocyanate and isocyanate-reactive composition are mixed together for forming a foam product.

As mentioned, the foam products disclosed herein may have a combination of properties that are desirable for a number of applications. For instance, the foam products disclosed herein may advantageously provide desirable molded foam densities, while also providing desirable dimensional stability.

The foam products disclosed herein may have a molded foam density from 27.0 to 31.0 kilograms per cubic meter (kg/m$^3$). All individual values and subranges from 27.0 to 31.0 kg/m$^3$ are included; for example, the foam product may have a molded foam density from a lower limit of 27.0, 27.2, 27.5, 28.0, 28.5, or 29.0 kg/m$^3$ to an upper limit of 31.0, 30.8, 30.4 or 30.0 kg/m$^3$. Foam products having such molded foam densities are highly desirable for a number of applications, e.g., the manufacturing of appliances such as refrigerator, freezer, portable cooler, etc.

The foam products disclosed herein can have a free rise density from 15 to 50 kg/m$^3$. All individual values and subranges from 15 to 50 kg/m$^3$ are included; for example, the foam product can have a free rise density from a lower limit of 15, 18, 20, 22, or 25 kg/m$^3$ to an upper limit of 50, 45, or 40 kg/m$^3$.

Additionally, while providing desirable molded foam densities, the foam products disclosed herein may advantageously provide desirable dimensional stability. A laboratory creep test may be utilized to determine dimensional stability. For instance, molded foam products may be prepared to have a weight of approximately 95 grams and dimensions of 30 cm×20 cm×5 cm. Three specimens, each having dimensions of 5 cm×5 cm×2.5 cm, may be respectively cut out from a middle and interior section of the molded foam product. The weight of each specimen may be first measured, followed by a volume determination by submerging each specimen in water and measuring the water displacement volume. Each specimen may then be patted dry using paper towels and then placed in a pressure vessel at room temperature filled with nitrogen at 1 bar pressure for 10 minutes. The specimens may then be taken out of the pressure vessel to determine respective final volumes by water immersion/displacement, as previously discussed. Depending on each foam product's dimensional stability, the specimens may exhibit varying amounts of dimensional change in terms of size and shape after this pressure vessel testing. The percentage of creep may be defined as: [($V_0$−$V_1$)/$V_0$]×100%, where $V_0$ is the original volume of the foam being tested and $V_1$ is the volume of the foam being tested after exposure to 1 bar pressure for 10 min in the pressure vessel. As used herein, a foam product is dimensionally stable if the foam product provides creep % from 0.0% to 10.0%. All individual values and subranges from 0.0% to 10.0% are included; for example, the foam product may have a creep % from a lower limit of 0.0, 0.05, or 0.1% to an upper limit of 10.0, 9.0, 8.0, 7.0, 6.0, 5.0, 4.0, or 3.0%.

Examples

In the Examples, various terms and designations for materials are used including, for instance, the following:
VORANOL™ RN 482 (sorbitol-initiated polyol; average functionality 6.0; number average molecular weight 700 g/mol; equivalent weight 117 g/eq; average hydroxyl number 480 mg KOH/g; obtained from The Dow Chemical Company);
amine-initiated polyol (toulenediamine initiated polyol; average functionality 4.0; number average molecular weight 476 g/mol; equivalent weight 119 g/eq; average hydroxyl number 471 mg KOH/g). The amine-initiated polyol was formed utilizing toulenediamine, propylene oxide, and ethylene oxide.
VORANOL™ 360 (sucrose/glycerine-initiated polyether polyol; average functionality 4.7; number average molecular weight 733 g/mol; equivalent weight 156 g/eq; average hydroxyl number 360 mg KOH/g; obtained from The Dow Chemical Company);
VORANOL™ 2110 TB (polyether diol; average functionality 2.0; number average molecular weight 1020 g/mol; equivalent weight 510 g/eq; average hydroxyl number 110 mg KOH/g; obtained from The Dow Chemical Company);
STEPANPOL PS 2352 (aromatic polyester polyol; average functionality 2.0; number average molecular weight 468 g/mol; equivalent weight 234 g/eq; average hydroxyl number 240 mg KOH/g; obtained from Stepan Chemical);
DOW™ P-425 (glycol; average functionality 2.0; number average molecular weight 425 g/mol; equivalent weight 212.5 g/eq; average hydroxyl number 264 mg KOH/g; obtained from The Dow Chemical Company);
VORANOL™ 225 (glycerine initiated polyether polyol; average functionality 3.0; number average molecular weight 225 g/mol; equivalent weight 85 g/eq; average hydroxyl number 660 mg KOH/g; obtained from The Dow Chemical Company);
high-functionality crosslinker (dipentaerythritol penta-/hexa-acrylate (DPPA); obtained from Sigma-Aldrich/MilliporeSigma);
POLYCAT 5 (catalyst; PMDETA-N,N,N',N'',N''-pentamethyldiethylenetriamine; obtained from Evonik);
POLYCAT 41 (catalyst; N,N',N''-Tris(3-dimethylaminopropyl)hexahydro-S-triazine; obtained from Evonik);
POLYCAT 8 (catalyst; N,N-dimethylcyclo-hexylamine; obtained from Evonik);
SPE surfactant EP-A-98 (surfactant; silicone polyether surfactant; obtained from Evonik);
Solstice 1233zd Liquid Blowing Agent (physical blowing agent; trans-1-chloro-3,3,3-trifluoropropene; obtained from Honeywell);
LuperoxATC50 free radical initiator (50 wt % Benzoyl peroxide in tricresyl phosphate; obtained from Sigma-Aldrich/MilliporeSigma);
Azo type radical initiator (2,2'azobis(isobutyronitrile, obtained from Sigma-Aldrich/MilliporeSigma); and
Isocyanate (PAPI™ 27 polymethylene polyphenylisocyanate that contains MDI and has a NCO content of approximately 31.4 wt % and isocyanate equivalent molecular weight of 134; obtained from the Dow Chemical Company).

Example 1, an isocyanate-reactive composition, was prepared as follows. The polyols listed in Table 1 were combined in a container by mixing to form a polyol composition. Surfactant, catalyst, and water were added to the container and the contents were mixed at 500 rpm using an overhead mixer at room temperature for approximately 2 minutes to provide Example 1. The components and amounts that were utilized are listed in Table 1.

Example 2, a hybrid foam formulation, was prepared as follows. A stock solution of polyisocyanate containing 2 weight percent AIBN was first prepared by adding solid AIBN powder (50 grams) into a container with PAPI™ 27 (2450 grams) at room temperature and thoroughly mixed into a homogeneous solution with no visible agglomerate of AIBN solid particles. A total of 165.8 parts of the stock solution was then added to a container with 100 parts of polyol and high-functionality crosslinker, Solstice 1233zd Liquid Blowing Agent, and components, as reported in Table 1. The contents of the container were immediately mixed by an overhead mixer at 3000 rpm and room temperature for approximately 3 seconds; the content weighed approximately 145 grams. The mixed contents (approximately 95 grams) were immediately poured into a preheated mold (60° C.) for forming Example 3, a foam product. The size of the mold was 5 cm×20 cm×30 cm. The mold was placed vertically along the mold's length direction for foaming. The foam product was removed from the mold after 5 min and placed in a lab bench overnight prior to conducting physical properties testing on the resulting foam product. The components and amounts that were utilized are listed in Table 1. The isocyanate index for Example 2 was 120. Each Example hybrid foam formulation and each Comparative foam formulation of the examples section had an isocyanate index of 120, unless indicated otherwise. For each hybrid foam formulation and each Comparative foam formulation of the examples section, the respective amounts of water and Solstice 1233zd Liquid Blowing Agent were adjusted to provide that the total gaseous amount of blowing agent in the final foam products was approximately 27.5 cm$^3$ gas/gram of foam; and the mole percent of $CO_2$ was approximately 25.8%, unless indicated otherwise.

Comparative Examples A-C were prepared as Examples 1-3, with the changes that the components and/or amounts as indicated in Table 1 were respectively utilized.

TABLE 1

| | Example 1 (isocyanate-reactive composition) | Comparative Example A |
|---|---|---|
| | parts based upon 100 parts of a combination of total polyols and the high-functionality crosslinker | |
| VORANOL ™ RN 482 | 40 parts | 40 parts |
| amine initiated polyol VORANOL ™ 360 | 32 parts | 32 parts |
| | 8 parts | 8 parts |
| High-functionality crosslinker (dipentaerythritol penta-/hexa-acrylate) | 20 parts | 20 parts |
| Water | 1.79 parts | 1.79 parts |
| POLYCAT 5 | 1.6 parts | 1.6 parts |
| POLYCAT 41 | 1.1 parts | 1.1 parts |
| POLYCAT 8 | 0.6 parts | 0.6 parts |
| SPE surfactant | 5.0 parts | 5.0 parts |
| average hydroxyl functionality (based upon total polyols) | 4.9 | 4.9 |
| average hydroxyl number (based upon total polyols) | 465 mg KOH/g | 465 mg KOH/g |
| number average molecular weight (based upon total polyols) | 591 g/mol | 591 g/mol |

| | Example 2 (Hybrid foam formulation) | Comparative Example B |
|---|---|---|
| PAPI ™ 27 | 162.5 parts (based upon 100 parts of a combination of total polyols of the polyol composition and the high-functionality crosslinker) | 162.5 parts (based upon 100 parts of total polyols) |
| AIBN (Azo type radical initiator) | 3.3 parts (based upon 100 parts of a combination of total polyols of the polyol composition and the high-functionality crosslinker) | — |
| Luperox ATC50, (radical initiator) | — | 3.3 parts (based upon 100 parts of total polyols) |
| Solstice 1233zd Liquid Blowing Agent | 37.3 parts (based upon 100 parts of a combination of total polyols and the high-functionality crosslinker) | 37.3 parts (based upon 100 parts of a combination of total polyols and the high-functionality crosslinker) |

| Foam Products | | |
|---|---|---|
| | Example 3 | Comparative Example C |
| Visual observation | uniform cell structure with no observable cell coalescence and formation of large cells | nonuniform cell structure and observable cell deformities including undesirable large cell sizes that resulted from cell coalescence |

Example 3 and Comparative Example C were visually observed to compare cell structures of the respective foam products. Visual observation determined that Example 3 had uniform cell structure with no observable cell coalescence and formation of large cells. In contrast, Comparative Example C showed nonuniform cell structure and observable cell deformities including undesirable large cell sizes that resulted from cell coalescence when benzoyl peroxide was utilized. Foams with large cell size and/or nonuniform cell structure may have undesirable physical properties, such as poor thermal insulation performance and reduced mechanical strength.

Examples 4-8, isocyanate-reactive compositions, and Comparative Examples D-H, S-Y, and NN-TT were prepared as Example 1, with the changes that the components as indicated in Tables 2-5 were respectively utilized.

Example 9-13, hybrid foam formulations, and Comparative Examples I-M, Z-FF, and UU-AAA were prepared as Example 2 with the changes that Examples 4-8 and Comparative Examples D-H, S-Y, and NN-TT were respectively utilized rather than Example 1 and the components and/or amounts as indicated in Tables 2-5 were respectively utilized.

Examples 14-18, foam products, and Comparative Examples N-R, GG-MM, and BBB-HHH were formed by respectively curing Examples 9-13 and Comparative Examples I-M, Z-FF, and UU-AAA.

Molded foam densities for Examples 14-18 and Comparative Examples N-R, GG-MM, and BBB-HHH were determined from the same specimens used for the creep measurement. Three specimens were cut out of the middle interior section of the molded foams. Each specimen was approximately 2"×2"×1". The weight and volume of each specimen was determined for density calculation prior to subjecting the specimen to the 1 bar pressure treatment. The density measured on three specimens was averaged and reported as the molded foam density. Creep percents for Examples 14-18 and Comparative Examples N-R, GG-MM, and BBB-HHH were determined by creep testing as previously discussed. The results are reported in Tables 2-5.

TABLE 2

| Isocyanate-reactive compositions | | | | | |
|---|---|---|---|---|---|
| | Example 4 | Example 5 | Example 6 | Example 7 | Example 8 |
| | parts based upon 100 parts of a combination of total polyols of the polyol composition and the high-functionality crosslinker | | | | |
| VORANOL™ RN 482 | 49.5 parts | 45.0 parts | 45.0 parts | 36.0 parts | 36.0 parts |
| amine initiated polyol | 40.5 parts | 36.0 parts | 36.0 parts | 34.2 parts | 34.2 parts |
| VORANOL™ 360 | — | — | 9.0 parts | 10.8 parts | 10.8 parts |
| VORANOL™ 2110 | — | — | — | 9.0 parts | 4.5 parts |
| STEPANPOL PS 2352 | — | — | — | — | 4.5 parts |
| P-425 | — | 9.0 parts | — | — | — |
| high-functionality crosslinker (dipentaerythritol penta-/hexa-acrylate) | 10.0 parts | 10.0 parts | 10.0 parts | 10.0 parts | 10.0 parts |
| SPE surfactant | 5.0 parts | 5.0 parts | 5.0 parts | 5.0 parts | 5.0 parts |
| POLYCAT 5 | 1.6 parts | 1.6 parts | 1.6 parts | 1.6 parts | 1.6 parts |
| POLYCAT 41 | 1.1 parts | 1.1 parts | 1.1 parts | 1.1 parts | 1.1 parts |
| POLYCAT 8 | 0.6 parts | 0.6 parts | 0.6 parts | 0.6 parts | 0.6 parts |
| Water | 1.72 parts | 1.68 parts | 1.69 parts | 1.62 parts | 1.63 parts |
| average hydroxyl functionality (based upon total polyols of the polyol composition) | 4.30 | 4.54 | 4.90 | 4.65 | 4.56 |
| average hydroxyl number (based upon total polyols of the polyol composition) | 410 mg KOH/g | 456 mg KOH/g | 466 mg KOH/g | 426 mg KOH/g | 432 mg KOH/g |
| number average molecular weight (based upon total polyols of the polyol composition) | 590 g/mol | 558 g/mol | 591 g/mol | 612 g/mol | 592 g/mol |

| Hybrid foam formulation | | | | | |
|---|---|---|---|---|---|
| | Example 9 | Example 10 | Example 11 | Example 12 | Example 13 |
| PAPI™ 27 | 151.1 parts (based upon 100 parts of a combination of total polyols of the polyol composition and the high-functionality crosslinker) | 144.9 parts (based upon 100 parts of a combination of total polyols of the polyol composition and the high-functionality crosslinker) | 147.6 parts (based upon 100 parts of a combination of total polyols of the polyol composition and the high-functionality crosslinker) | 136.3 parts (based upon 100 parts of a combination of total polyols of the polyol composition and the high-functionality crosslinker) | 138.1 parts (based upon 100 parts of a combination of total polyols of the polyol composition and the high-functionality crosslinker) |
| AIBN (Azo type radical initiator) | 3.10 parts (based upon 100 parts of a combination of total polyols of the polyol composition and the high-functionality crosslinker) | 2.96 parts (based upon 100 parts of a combination of total polyols of the polyol composition and the high-functionality crosslinker) | 3.01 parts (based upon 100 parts of a combination of total polyols of the polyol composition and the high-functionality crosslinker) | 2.78 parts (based upon 100 parts of a combination of total polyols of the polyol composition and the high-functionality crosslinker) | 2.82 parts (based upon 100 parts of a combination of total polyols of the polyol composition and the high-functionality crosslinker) |

TABLE 2-continued

| | Example 14 | Example 15 | Example 16 | Example 17 | Example 18 |
|---|---|---|---|---|---|
| Solstice 1233zd Liquid Blowing Agent | 35.8 parts (based upon 100 parts of a combination of total polyols of the polyol composition and the high-functionality crosslinker) | 34.9 parts (based upon 100 parts of a combination of total polyols of the polyol composition and the high-functionality crosslinker) | 35.2 parts (based upon 100 parts of a combination of total polyols of the polyol composition and the high-functionality crosslinker) | 33.7 parts (based upon 100 parts of a combination of total polyols of the polyol composition and the high-functionality crosslinker) | 34.0 parts (based upon 100 parts of a combination of total polyols of the polyol composition and the high-functionality crosslinker) |
| | Foam Products | | | | |
| | Example 14 | Example 15 | Example 16 | Example 17 | Example 18 |
| Molded foam density (kg/m$^3$) | 29.8 | 29.8 | 29.5 | 29.4 | 28.5 |
| Creep % | 2.0% | 6.9% | 2.6% | 5.8% | 1.9% |

The data of Table 2 illustrates that each of Examples 14-18 advantageously had a molded foam density from 27.0 to 31.0 kg/m$^3$ and a creep percent from 0.0% to 10.0%.

TABLE 3

| | Comparative Example D | Comparative Example E | Comparative Example F | Comparative Example G | Comparative Example H |
|---|---|---|---|---|---|
| | parts based upon 100 parts of total polyols utilized | | | | |
| VORANOL ™ RN 482 | 55.0 parts | 50.0 parts | 50.0 parts | 40.0 parts | 40.0 parts |
| amine initiated polyol | 45.0 parts | 40.0 parts | 40.0 parts | 38.0 parts | 38.0 parts |
| VORANOL ™ 360 | — | — | 10.0 parts | 12.0 parts | 12.0 parts |
| VORANOL ™ 2110 | — | — | — | 10.0 parts | 5.0 parts |
| STEPANPOL PS 2352 | — | — | — | — | 5.0 parts |
| P-425 | — | 10.0 parts | — | — | — |
| SPE surfactant | 5.0 parts | 5.0 parts | 5.0 parts | 5.0 parts | 5.0 parts |
| POLYCAT 5 | 1.6 parts | 1.6 parts | 1.6 parts | 1.6 parts | 1.6 parts |
| POLYCAT 41 | 1.1 parts | 1.1 parts | 1.1 parts | 1.1 parts | 1.1 parts |
| POLYCAT 8 | 0.6 parts | 0.6 parts | 0.6 parts | 0.6 parts | 0.6 parts |
| Water | 1.82 parts | 1.77 parts | 1.79 parts | 1.72 parts | 1.72 parts |
| average hydroxyl functionality (based upon total polyols utilized) | 4.30 | 4.54 | 4.90 | 4.65 | 4.56 |
| average hydroxyl number (based upon total polyols utilized) | 410 mg KOH/g | 456 mg KOH/g | 466 mg KOH/g | 426 mg KOH/g | 432 mg KOH/g |
| number average molecular weight (based upon total polyols utilized) | 590 g/mol | 558 g/mol | 591 g/mol | 612 g/mol | 592 g/mol |
| | Foam formulations | | | | |
| | Comparative Example I | Comparative Example J | Comparative Example K | Comparative Example L | Comparative Example M |
| PAPI ™ 27 | 169.7 parts (based upon 100 parts of total polyols) | 162.6 parts (based upon 100 parts of total polyols) | 165.8 parts (based upon 100 parts of total polyols) | 153.2 parts (based upon 100 parts of total polyols) | 155.0 parts (based upon 100 parts of total polyols) |
| Solstice 1233zd Liquid Blowing Agent | 37.8 parts (based upon 100 parts of total | 36.8 parts (based upon 100 parts of | 37.3 parts (based upon 100 parts of | 35.8 parts (based upon 100 parts of | 35.8 parts (based upon 100 parts of |

TABLE 3-continued

|  | polyols) | total polyols) | total polyols) | total polyols) | total polyols) |
|---|---|---|---|---|---|
| Foam Products ||||||
|  | Comparative Example N | Comparative Example O | Comparative Example P | Comparative Example Q | Comparative Example R |
| Molded foam density (kg/m³) | 29.7 | 29.6 | 29.6 | 29.0 | 29.8 |
| Creep % | 16.7% | 14.0% | 15.1% | 20.2% | 12.8% |

The data of Table 3 illustrates that each of Comparative Examples N, O, P, Q, and R had a molded foam density from 27.0 to 31.0 kg/m³. However, in contrast to Examples 14-18, Comparative Examples N, O, P, Q, and R each had a creep percent greater than 10.0%.

TABLE 4

|  | Comp Ex S | Comp Ex T | Comp Ex U | Comp Ex V | Comp Ex W | Comp Ex X | Comp Ex Y |
|---|---|---|---|---|---|---|---|
| parts based upon 100 parts of total polyols utilized ||||||||
| VORANOL™ RN 482 | — | 90.0 parts | — | 45.0 parts | 50.0 parts | 18.0 parts | 25.0 parts |
| amine initiated polyol | — | — | 35.0 parts | 10.0 parts | — | — | 40.0 parts |
| VORANOL™ 360 | 100 parts | — | 40.0 parts | — | — | 70.0 parts | — |
| VORANOL™ 2110 | — | 10.0 parts | — | — | 35.0 parts | 12.0 parts | — |
| STEPANPOL PS 2352 | — | — | — | — | — | — | — |
| P-425 | — | — | 25.0 parts | — | 15.0 parts | — | — |
| VORANOL™ 225 | — | — | — | 45.0 parts | — | — | 35.0 parts |
| SPE surfactant | 5.0 parts | 5.0 parts | 5.0 parts | 5.0 parts | 5.0 parts | 5.0 parts | 5.0 parts |
| POLYCAT 5 | 1.6 parts | 1.6 parts | 1.6 parts | 1.6 parts | 1.6 parts | 1.6 parts | 1.6 parts |
| POLYCAT 41 | 1.1 parts | 1.1 parts | 1.1 parts | 1.1 parts | 1.1 parts | 1.1 parts | 1.1 parts |
| POLYCAT 8 | 0.6 parts | 0.6 parts | 0.6 parts | 0.6 parts | 0.6 parts | 0.6 parts | 0.6 parts |
| Water | 1.56 parts | 1.75 parts | 1.60 parts | 2.00 parts | 1.48 parts | 1.55 parts | 1.95 parts |
| average hydroxyl functionality (based upon total polyols utilized) | 4.70 | 5.72 | 3.57 | 3.82 | 4.03 | 4.70 | 3.74 |
| average hydroxyl number (based upon total polyols utilized) | 360 mg KOH/g | 445 mg KOH/g | 375 mg KOH/g | 561 mg KOH/g | 319 mg KOH/g | 352 mg KOH/g | 540 mg KOH/g |
| number average molecular weight (based upon total polyols utilized) | 733 g/mol | 721 g/mol | 535 g/mol | 382 g/mol | 708 g/mol | 752 g/mol | 389 g/mol |

TABLE 4-continued

| | \multicolumn{7}{c}{Foam formulations} | | | | | | |
|---|---|---|---|---|---|---|---|
| | Comp Ex Z | Comp Ex AA | Comp Ex BB | Comp Ex CC | Comp Ex DD | Comp Ex EE | Comp Ex FF |
| PAPI ™ 27 | 131.2 parts (based upon 100 parts of total polyols) | 159.1 parts (based upon 100 parts of total polyols) | 136.3 parts (based upon 100 parts of total polyols) | 196.9 parts (based upon 100 parts of total polyols) | 118.1 parts (based upon 100 parts of total polyols) | 128.8 parts (based upon 100 parts of total polyols) | 190.0 parts (based upon 100 parts of total polyols) |
| Solstice 1233zd Liquid Blowing Agent | 32.6 parts (based upon 100 parts of total polyols) | 36.3 parts (based upon 100 parts of total polyols) | 33.2 parts (based upon 100 parts of total polyols) | 41.5 parts (based upon 100 parts of total polyols) | 30.8 parts (based upon 100 parts of total polyols) | 32.2 parts (based upon 100 parts of total polyols) | 40.6 parts (based upon 100 parts of total polyols) |

| | \multicolumn{7}{c}{Foam Products} | | | | | | |
|---|---|---|---|---|---|---|---|
| | Comp Ex GG | Comp Ex HH | Comp Ex II | Comp Ex JJ | Comp Ex KK | Comp Ex LL | Comp Ex MM |
| Molded foam density (kg/m$^3$) | 29.4 | 28.9 | 29.1 | 29.4 | 29.9 | 29.3 | 29.2 |
| Creep % | 28.6% | 27.3% | 26.9% | 18.2% | 31.8% | 30.0% | 17.3% |

The data of Table 4 illustrates that each of Comparative Examples GG-MM had a molded foam density from 27.0 to 31.0 kg/m$^3$. However, in contrast to Examples 14-18, each of Comparative Examples GG-MM had a creep percent greater than 10.0%.

TABLE 5

| | Comp Ex NN | Comp Ex OO | Comp Ex PP | Comp Ex QQ | Comp Ex RR | Comp Ex SS | Comp Ex TT |
|---|---|---|---|---|---|---|---|
| | \multicolumn{7}{c}{parts based upon 100 parts of a combination of total polyols and dipentaerythritol penta-/hexa-acrylate} | | | | | | |
| VORANOL ™ RN 482 | — | 81.0 parts | — | 40.5 parts | 45.0 parts | 16.2 parts | 22.5 parts |
| amine initiated polyol | — | — | 31.5 parts | 9.0 parts | — | — | 36.0 parts |
| VORANOL ™ 360 | 90.0 parts | — | 36.0 parts | — | — | 63.0 parts | — |
| VORANOL ™ 2110 | — | 9.0 parts | — | — | 31.5 parts | 10.8 parts | — |
| P-425 | — | — | 22.0 parts | — | 13.5 parts | — | — |
| VORANOL ™ 225 | — | — | — | 40.5 parts | — | — | 31.5 parts |
| dipentaerythritol penta-/hexa-acrylate | 10.0 parts | 10.0 parts | 10.0 parts | 10.0 parts | 10.0 parts | 10.0 parts | 10.0 parts |
| SPE surfactant | 5.0 parts | 5.0 parts | 5.0 parts | 5.0 parts | 5.0 parts | 5.0 parts | 5.0 parts |
| POLYCAT 5 | 1.6 parts | 1.6 parts | 1.6 parts | 1.6 parts | 1.6 parts | 1.6 parts | 1.6 parts |
| POLYCAT 41 | 1.1 parts | 1.1 parts | 1.1 parts | 1.1 parts | 1.1 parts | 1.1 parts | 1.1 parts |
| POLYCAT 8 | 0.6 parts | 0.6 parts | 0.6 parts | 0.6 parts | 0.6 parts | 0.6 parts | 0.6 parts |
| Water | 1.49 parts | 1.65 parts | 1.52 parts | 1.88 parts | 1.41 parts | 1.47 parts | 1.83 parts |

TABLE 5-continued

| | | | | | | | |
|---|---|---|---|---|---|---|---|
| average hydroxyl functionality (based upon total polyols utilized) | 4.70 | 5.72 | 3.57 | 3.82 | 4.03 | 4.70 | 3.74 |
| average hydroxyl number (based upon total polyols utilized) | 360 mg KOH/g | 445 mg KOH/g | 375 mg KOH/g | 561 mg KOH/g | 319 mg KOH/g | 352 mg KOH/g | 540 mg KOH/g |
| number average molecular weight (based upon total polyols utilized) | 733 g/mol | 721 g/mol | 535 g/mol | 382 g/mol | 708 g/mol | 752 g/mol | 389 g/mol |

| | Foam formulations | | | | | | |
|---|---|---|---|---|---|---|---|
| | Comp Ex UU | Comp Ex VV | Comp Ex WW | Comp Ex XX | Comp Ex YY | Comp Ex ZZ | Comp Ex AAA |
| PAPI ™ 27 | 117.2 parts (based upon 100 parts of total polyols and DPPA) | 141.6 parts (based upon 100 parts of total polyols and DPPA) | 121.6 parts (based upon 100 parts of total polyols and DPPA) | 175.1 parts (based upon 100 parts of total polyols and DPPA) | 105.6 parts (based upon 100 parts of total polyols and DPPA) | 114.9 parts (based upon 100 parts of total polyols and DPPA) | 168.9 parts (based upon 100 parts of total polyols and DPPA) |
| AIBN (parts based upon 100 parts of total polyols and DPPA) | 2.4 parts | 2.9 parts | 2.5 parts | 3.6 parts | 2.1 parts | 2.3 parts | 3.4 parts |
| Solstice 1233zd Liquid Blowing Agent | 31.0 parts (based upon 100 parts of total polyols and DPPA) | 34.3 parts (based upon 100 parts of total polyols and DPPA) | 31.6 parts (based upon 100 parts of total polyols and DPPA) | 39.0 parts (based upon 100 parts of total polyols and DPPA) | 29.4 parts (based upon 100 parts of total polyols and DPPA) | 30.7 parts (based upon 100 parts of total polyols and DPPA) | 38.2 parts (based upon 100 parts of total polyols and DPPA) |

| | Foam Products | | | | | | |
|---|---|---|---|---|---|---|---|
| | Comp Ex BBB | Comp Ex CCC | Comp Ex DDD | Comp Ex EEE | Comp Ex FFF | Comp Ex GGG | Comp Ex HHH |
| Molded foam density (kg/m$^3$) | 30.2 | 28.7 | 29.2 | 29.5 | 29.2 | 30.2 | 29.5 |
| Creep % | 21.7% | 25.2% | 23.8% | 18.6% | 40.7% | 28.7% | 15.2% |

The data of Table 5 illustrates that each of Comparative Examples BBB-HHH had a molded foam density from 27.0 to 31.0 kg/m$^3$. However, in contrast to Examples 14-18, each of Comparative Examples BBB-HHH had a creep percent greater than 10.0%.

Examples 19-21 (isocyanate-reactive compositions), Examples 22-24 (hybrid foam formulations), Examples 25-27 (foam products), and Comparative Examples III-KKK were respectively prepared utilizing a high pressure foaming process with Hi-tech Engineering—EcoRim machine as follows. Polyisocyanate (PAPI 27 or PAPI 27 dissolved with 2 wt % AIBN radical initiator), which was referred to as an "A side", was charged into a tank. Various amounts of polyols, high-functionality crosslinker, surfactants, catalysts, and water, and other components, if utilized, were pre-mixed to form a homogeneous mixture, which was referred to as an "B side" that was loaded to a separate tank. Solstice Liquid Blowing Agent (LBA) was then directly charged into the B-side tank and mixed for approximately 20 minutes with a built in agitator inside of the tank. Both of the tanks and the lines were thermally equilibrated at a constant temperature of 70° F. Then, the contents of the A-side tank and the contents of the B-side tank were mixed together by a high pressure impingement mixer at a desirable ratio. The pressure of pumps for transferring both A-side and B-side contents to the impingent mixer were set at 1500 psi. Based on the desirable density of foam products, selected amounts of the A-side and B-side contents were mixed and immediately injected into a mold cavity, where the components were allowed to react and expand. A Brett mold (200 cm×20 cm×5 cm) was utilized. The Brett mold was placed in an upright position along the length direction and the reactive components were injected to the mold at an injection point located near the bottom end of the mold. The Brett mold was thermally equilibrated at a temperature of 135° F. and its interior surface was coated with a thin layer of release agent. The foam products were removed from the mold after 5 min and then conditioned at ambient conditions in a laboratory for approximately 12 hours prior to testing physical properties. Three specimens (5 cm×5 cm×2.5 cm) were cut out of the Brett mold foam from its middle interior section for density and creep measurements. Additionally, for each of the foam Example 25-27 and Comparative Example KKK, the respective foaming mixtures (approximately 700 grams) were shot into a 15 gallon plastic bag to allow foaming inside of the plastic bag at an unconstrained condition. Foam core densities for these "bag shot" foams was determined from a specimen cut out of the middle interior part (approximately 4 in×4 in×4 in), and reported as free rise density. The components and amounts that were utilized, as well as creep percents, molded foam densities, and free rise densities, are listed in Table 6.

TABLE 6

|  | Isocyanate-reactive compositions | | | Comparative Example III |
|---|---|---|---|---|
|  | Example 19 | Example 20 | Example 21 | parts based upon 100 parts of total polyols |
|  | parts based upon 100 parts of a combination of total polyols of the polyol composition and the high-functionality crosslinker | | | |
| VORANOL ™ RN 482 | 38.0 parts | 36.0 parts | 32.0 parts | 40.0 parts |
| amine initiated polyol | 36.1 parts | 34.2 parts | 30.4 parts | 38.0 parts |
| VORANOL ™ 360 | 11.4 parts | 10.8 parts | 9.6 parts | 12.0 parts |
| VORANOL ™ 2110 | 4.75 parts | 4.5 parts | 4.0 parts | 5.0 parts |
| STEPANPOL PS 2352 | 4.75 parts | 4.5 parts | 4.0 parts | 5.0 parts |
| high-functionality crosslinker (dipentaerythritol penta-/hexa-acrylate) | 5.0 parts | 10.0 parts | 20.0 parts | — |
| SPE surfactant | 5.0 parts | 5.0 parts | 5.0 parts | 5.0 parts |
| POLYCAT 5 | 1.6 parts | 1.6 parts | 1.6 parts | 1.6 parts |
| POLYCAT 41 | 1.1 parts | 1.1 parts | 1.1 parts | 1.1 parts |
| POLYCAT 8 | 0.6 parts | 0.6 parts | 0.6 parts | 0.6 parts |
| Water | 1.68 parts | 1.64 parts | 1.55 parts | 1.72 parts |
| average hydroxyl functionality (based upon total polyols of the polyol composition) | 4.56 | 4.56 | 4.56 | 4.56 |
| average hydroxyl number (based upon total polyols of the polyol composition) | 432 mg KOH/g | 432 mg KOH/g | 432 mg KOH/g | 432 mg KOH/g |
| number average molecular weight (based upon total polyols of the polyol composition) | 592 g/mol | 592 g/mol | 592 g/mol | 592 g/mol |

|  | Hybrid foam formulation | | | Comparative |
|---|---|---|---|---|
|  | Example 22 | Example 23 | Example 24 | Example JJJ |
| PAPI ™ 27 | 145.5 parts (based upon 100 parts of a combination of total polyols of the polyol composition and the high- | 139.2 parts (based upon 100 parts of a combination of total polyols of the polyol composition | 126.4 parts (based upon 100 parts of a combination of total polyols of the polyol composition | 155.0 parts (based upon 100 parts of total polyols) |

TABLE 6-continued

|  | Example 25 | Example 26 | Example 27 | Comparative Example KKK |
|---|---|---|---|---|
| AIBN (Azo type radical initiator) | 3.0 parts (based upon 100 parts of a combination of total polyols of the polyol composition and the high-functionality crosslinker) | 2.8 parts (based upon 100 parts of a combination of total polyols of the polyol composition and the high-functionality crosslinker) | 2.6 parts (based upon 100 parts of a combination of total polyols of the polyol composition and the high-functionality crosslinker) | — |
| Solstice 1233zd Liquid Blowing Agent | 35.0 parts (based upon 100 parts of a combination of total polyols of the polyol composition and the high-functionality crosslinker) | 34.1 parts (based upon 100 parts of a combination of total polyols of the polyol composition and the high-functionality crosslinker) | 32.3 parts (based upon 100 parts of a combination of total polyols of the polyol composition and the high-functionality crosslinker) | 35.8 parts (based upon 100 parts of total polyols) |

|  | Foam Products | | | Comparative Example |
|---|---|---|---|---|
|  | Example 25 | Example 26 | Example 27 | KKK |
| Molded foam density (kg/m$^3$) | 28.7 | 28.8 | 28.4 | 28.7 |
| Creep % | 1.8% | 8.5% | 5.5% | 15.4% |
| Free rise (kg/m$^3$) | 23.0 | 23.2 | 22.0 | 24.2 |

The data of Table 6 illustrates that each of Examples 25-27 advantageously had a molded foam density from 27.0 to 31.0 kg/m$^3$ and a creep percent from 0.0% to 10.0%, as well as a free rise density from 15 to 50 kg/m$^3$. The data of Table 6 further illustrates that each of Comparative Example KKK had a molded foam density from 27.0 to 31.0 kg/m$^3$ and free rise density from 15 to 50 kg/m$^3$. However, in contrast to Examples 25-27, Comparative Example KKK had a creep percent greater than 10.0%.

What is claimed is:

1. An isocyanate-reactive composition comprising:
a polyol composition having an average hydroxyl functionality from 3.7 to 5.7 based upon total polyols of the polyol composition, an average hydroxyl number from 370 to 550 mg KOH/g based upon total polyols of the polyol composition, and a number average molecular weight from 400 to 750 g/mol based upon total polyols of the polyol composition, wherein the polyol composition includes a sorbitol-initiated polyether polyol having a number average molecular weight from 500 to 1100 g/mol and an average hydroxyl number from 300 to 600 mg KOH/g, an amine-initiated polyol having a number average molecular weight from 250 to 750 g/mol and an average hydroxyl number from 250 to 650 mg KOH/g, and a sucrose and glycerine initiated polyether polyol having a number average molecular weight from 500 to 1250 g/mol and an average hydroxyl number from 260 to 460 mg KOH/g;
a high-functionality crosslinker having an average functionality of 3.0 or more, wherein functional groups of the high-functionality crosslinker are selected from acrylate groups, allyl groups, OH groups, NH$_2$ groups, COOH groups, and combinations thereof, wherein from 10 to 99 percent of the functional groups of the high-functionality crosslinker are acrylate groups, allyl groups, or combinations thereof, and wherein the high-functionality crosslinker is from 10 to 40 parts by weight of the isocyanate-reactive composition based upon 100 parts by weight of a combination of total polyols of the polyol composition and the high-functionality crosslinker, the sorbitol-initiated polyether polyol is from 30 to 75 parts by weight of the isocyanate-reactive composition based upon 100 parts by weight of the combination of total polyols of the polyol composition and the high-functionality crosslinker, the amine-initiated polyol is from 30 to 75 parts by weight of the isocyanate-reactive composition based upon 100 parts by weight of the combination of total polyols of the polyol composition and the high-functionality crosslinker, and the sucrose and glycerine initiated polyether polyol is from 5 to 25 parts by weight of the isocyanate-reactive composition based upon 100 parts by weight of the combination of total polyols of the polyol composition and the high-functionality crosslinker; and
a blowing agent that includes a physical blowing agent and a chemical blowing agent, wherein the blowing agent is from 1.0 to 50.0 parts by weight of the isocyanate-reactive composition based upon 100 parts by weight of the combination of total polyols of the polyol composition and the high-functionality crosslinker.

2. The isocyanate-reactive composition of claim 1, wherein the high-functionality crosslinker has a number average molecular weight from 100 to 1500 g/mol.

3. The isocyanate-reactive composition of claim 1, wherein the high-functionality crosslinker is selected from dipentaerythritol pentaacrylate, dipentaerythritol penta-/hexa-acrylate, pentaerythritol triacrylate, and combinations thereof.

4. A hybrid foam formulation comprising:
the isocyanate-reactive composition of claim 1;
an azo type radical initiator; and
an isocyanate.

5. The hybrid foam formulation of claim 4, wherein the azo type radical initiator is from 0.01 to 5.0 parts by weight of the hybrid foam formulation based upon 100 parts by weight of a combination of total polyols of the polyol composition and the high-functionality crosslinker.

6. The foam formulation of claim 4, wherein the azo type radical initiator has a half-life temperature for 0.10 hour from 0° ° C. to 135° C.

7. The foam formulation of claim 4, wherein the azo type radical initiator is 2,2'-azobis(isobutyronitrile).

8. A foam product formed by curing the hybrid foam formulation of claim 4.

9. A method of forming a foam product, the method comprising:
combining:
an isocyanate-reactive composition comprising a polyol composition, a high-functional crosslinker, and a blowing agent,
the polyol composition having an average hydroxyl functionality from 3.7 to 5.7 based upon total polyols of the polyol composition, an average hydroxyl number from 370 to 550 mg KOH/g based upon total polyols of the polyol composition, and a number average molecular weight from 400 to 750 g/mol based upon total polyols of the polyol composition, wherein the polyol composition includes a sorbitol-initiated polyether polyol having a number average molecular weight from 500 to 1100 g/mol and an average hydroxyl number from 300 to 600 mg KOH/g, an amine-initiated polyol having a number average molecular weight from 250 to 750 g/mol and an average hydroxyl number from 250 to 650 mg KOH/g, and a sucrose and glycerine initiated polyether polyol having a number average molecular weight from 500 to 1250 g/mol and an average hydroxyl number from 260 to 460 mg KOH/g;
the high-functionality crosslinker having an average functionality of 3.0 or more, wherein functional groups of the high-functionality crosslinker are selected from acrylate groups, allyl groups, OH groups, $NH_2$ groups, COOH groups, and combinations thereof, wherein from 10 to 99 percent of the functional groups of the high-functionality crosslinker are acrylate groups, allyl groups, or combinations thereof, and wherein the high-functionality crosslinker is from 10 to 40 parts by weight of the isocyanate-reactive composition based upon 100 parts by weight of a combination of total polyols of the polyol composition and the high-functionality crosslinker, the sorbitol-initiated polyether polyol is from 30 to 75 parts by weight of the isocyanate-reactive composition based upon 100 parts by weight of the combination of total polyols of the polyol composition and the high-functionality crosslinker, the amine-initiated polyol is from 30 to 75 parts by weight of the isocyanate-reactive composition based upon 100 parts by weight of the combination of total polyols of the polyol composition and the high-functionality crosslinker, and the sucrose and glycerine initiated polyether polyol is from 5 to 25 parts by weight of the isocyanate-reactive composition based upon 100 parts by weight of the combination of total polyols of the polyol composition and the high-functionality crosslinker; and
the blowing agent that includes a physical blowing agent and a chemical blowing agent, wherein the blowing agent is from 1.0 to 50.0 parts by weight of the isocyanate-reactive composition based upon 100 parts by weight of the combination of total polyols of the polyol composition and the high-functionality crosslinker;
an azo type radical initiator; and
an isocyanate to form a hybrid foam formulation; and
curing the hybrid foam formulation to form the foam product.

* * * * *